(12) United States Patent
Green et al.

(10) Patent No.: US 9,979,309 B1
(45) Date of Patent: May 22, 2018

(54) SYNCHRONOUS RECTIFICATION CONTROLLER

(71) Applicant: Infineon Technologies Austria AG, Villach (AT)

(72) Inventors: Peter Green, Rancho Palos Verdes, CA (US); Hongying Ding, Redondo Beach, CA (US); Roberto Quaglino, Villach (AT)

(73) Assignee: Infineon Technologies Austria AG, Villach (AT)

( * ) Notice: Subject to any disclaimer, the term of this patent is extended or adjusted under 35 U.S.C. 154(b) by 0 days. days.

(21) Appl. No.: 15/653,924

(22) Filed: Jul. 19, 2017

(51) Int. Cl.
*H02M 3/335* (2006.01)

(52) U.S. Cl.
CPC ............................... *H02M 3/33592* (2013.01)

(58) Field of Classification Search
CPC ......... H02M 3/33576; H02M 3/33592; H02M 7/217; H02M 3/335; Y02B 70/1458; Y02B 70/1475
See application file for complete search history.

(56) References Cited

U.S. PATENT DOCUMENTS

| 7,751,213 B2 * | 7/2010 | Toccaceli ......... H02M 3/33592 363/127 |
| 2007/0081371 A1 * | 4/2007 | Wittenbreder, Jr. .... H02M 1/08 363/127 |

OTHER PUBLICATIONS

"UCC24630 Synchronous Rectifier Controller with Ultra-Low-Standby Current," Texas Instruments, UCC24630, Mar. 2015, 40 pp.

* cited by examiner

*Primary Examiner* — Gary L Laxton
(74) *Attorney, Agent, or Firm* — Shumaker & Sieffert, P.A.

(57) ABSTRACT

In one example, a circuit for controlling synchronous rectification includes a first current compensation module, a second current compensation module, and a control module. The first current compensation module is configured to provide a first current into parasitic capacitance at a drain pin when a drain of a synchronous rectifier draws current from the parasitic capacitance. The drain pin is coupled to the drain of the synchronous rectifier via a resistor. The first current compensation module is further configured to generate a triggering signal using the first current. The second current compensation module is configured to draw a second current from the parasitic capacitance when the drain of the synchronous rectifier provides current into the parasitic capacitance and generate an arming signal using the second current. The control module is configured to activate the synchronous rectifier using the triggering signal and the arming signal.

20 Claims, 9 Drawing Sheets

US 9,979,309 B1

SYNCHRONOUS RECTIFICATION CONTROLLER

TECHNICAL FIELD

This disclosure relates to a control of a synchronous rectifier, such as a synchronous rectifier arranged in a flyback converter.

BACKGROUND

Synchronous rectification (also referred to as active rectification) is a signal rectification technique for improving the efficiency of a rectification circuit by using an actively controlled transistor instead of a diode. More specifically, a p-n junction diode will have a constant forward voltage drop that causes significant power loss in the p-n junction diode. Synchronous rectification techniques permit replacing the p-n junction diode with an actively controlled metal-oxide-semiconductor field-effect transistor (MOSFET) to bypass the constant voltage drop of the p-n junction diode while performing the same function as the p-n junction diode.

SUMMARY

In general, this disclosure is directed to techniques for controlling synchronous rectification. To permit detection of a drain to source voltage at a synchronous rectifier, current compensation modules may control a voltage at parasitic capacitance at a drain pin coupled to the drain of the synchronous rectifier by a resistor. For example, a first current compensation module may provide current into the parasitic capacitance and generate a triggering signal for controlling synchronous rectification and a second current compensation module may draw current from the parasitic capacitance and generate an arming signal for controlling synchronous rectification. In this way, an arming circuit may determine when to arm the synchronous rectifier using the arming signal and a triggering circuit may determine when to activate the armed synchronous rectifier.

In an example, a circuit for controlling synchronous rectification includes a first current compensation module, a second current compensation module, and a control module. The first current compensation module is configured to provide a first current into parasitic capacitance at a drain pin when a drain of a synchronous rectifier draws current from the parasitic capacitance. The drain pin is coupled to the drain of the synchronous rectifier via a resistor. The first current compensation module is further configured to generate a triggering signal using the first current. The second current compensation module is configured to draw a second current from the parasitic capacitance when the drain of the synchronous rectifier provides current into the parasitic capacitance and generate an arming signal using the second current. The control module is configured to activate the synchronous rectifier using the triggering signal and the arming signal.

In another example, a method for controlling synchronous rectification, the method includes providing a first current into parasitic capacitance at a drain pin when a drain of a synchronous rectifier draws current from the parasitic capacitance. The drain pin is coupled to the drain of the synchronous rectifier via a resistor. The method further includes generating a triggering signal using the first current and drawing a second current from the parasitic capacitance when the drain of the synchronous rectifier provides current into the parasitic capacitance. The method further includes generating an arming signal using the second current and activating the synchronous rectifier using the triggering signal and the arming signal.

In another example, power converter device includes a synchronous rectifier comprising a drain, a resistor having a first side and a second side, a drain pin coupled to the second side of the resistor, a first current compensation module, a second current compensation module, and a control module. The first side of the resistor being coupled to the drain pin of a synchronous rectification MOSFET. The first current compensation module is configured to provide a first current into parasitic capacitance at the drain pin when the drain of the synchronous rectifier draws current from the parasitic capacitance and generate a triggering signal using the first current. The second current compensation module is configured to draw a second current from the parasitic capacitance when the drain of the synchronous rectifier provides current into the parasitic capacitance and generate an arming signal using the second current. The control module is configured to activate the synchronous rectifier using the triggering signal and the arming signal.

Details of these and other examples are set forth in the accompanying drawings and the description below. Other features, objects, and advantages will be apparent from the description and drawings, and from the claims.

DETAILED DESCRIPTION

Figure 1:
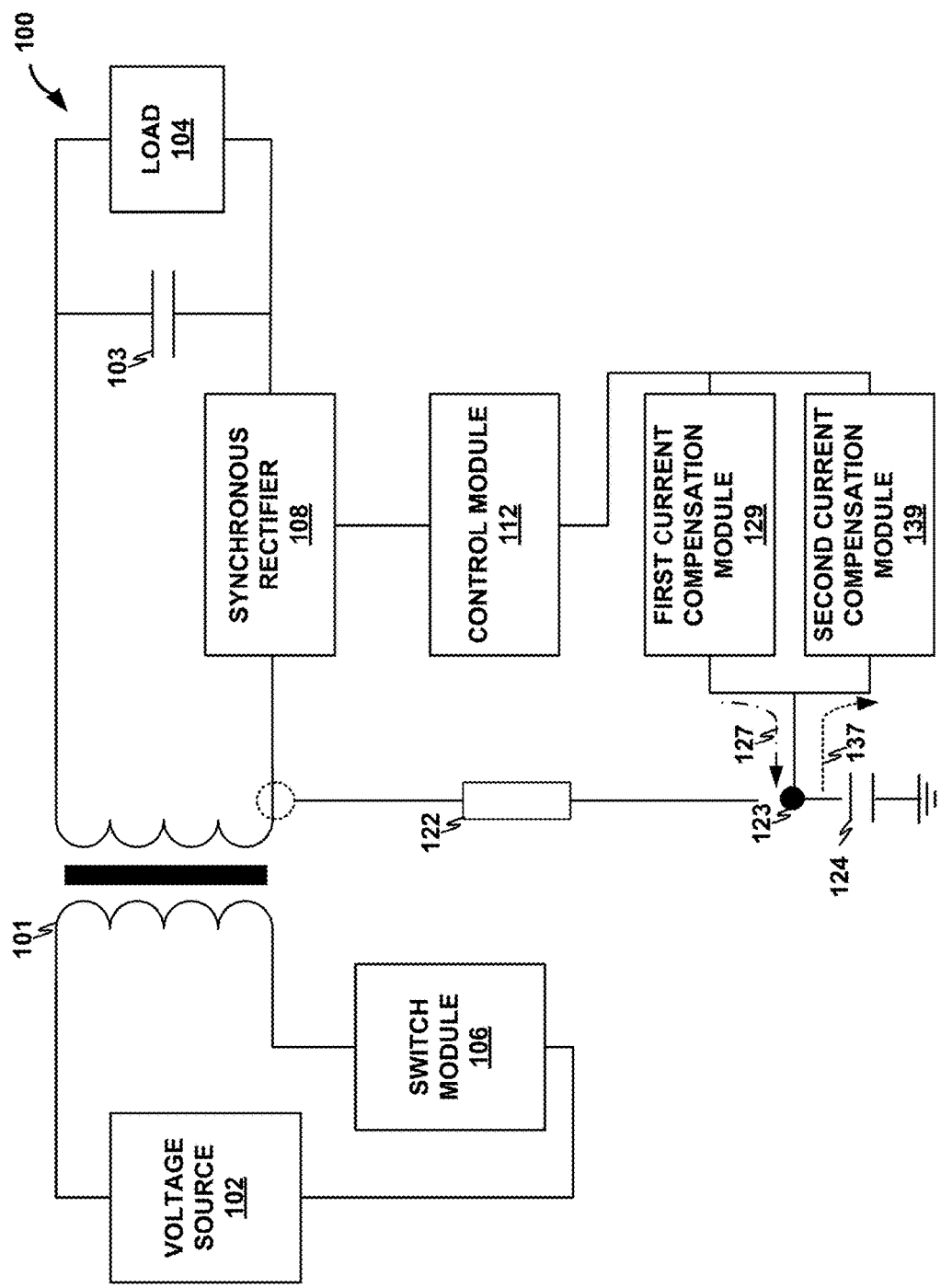
FIG. 1 is a block diagram illustrating an example system configured to control synchronous rectification, in accordance with one or more techniques of this disclosure.

In general, this disclosure is directed to techniques for controlling synchronous rectification, for instance, but not limited to, a synchronous rectifier arranged in a flyback converter. It is desirable for such controlling schemes to permit use of a relatively low voltage integrated circuit, prevent false triggering due to ringing oscillations, and permit continuous conduction mode operation.

In some systems, synchronous rectification controllers may directly sense a drain voltage at a synchronous rectification metal-oxide-semiconductor field-effect transistor (MOSFET), which can reach up to 200 Volts (V). Such systems may use relatively expensive high voltage integrated circuit (IC) technology compared to systems that permit voltages of less than 40 Volts (V).

Some synchronous rectification controllers may be prone to false triggering due to ringing oscillations when a flyback converter is operating in discontinuous conduction mode (DCM). Where highly efficient transformers are used, the ringing amplitude is greater compared to systems that omit highly efficient transformers. In such systems, a use of snubber networks to reduce this ringing reduces efficiency.

Further, a converter may enter continuous conduction mode (CCM) under certain load conditions. Some synchronous rectification controllers may rely entirely on detection of the synchronous rectification MOSFET drain to source voltage difference to determine when to turn-on and turn-off. As such, when such systems are operating in CCM, there may be a delay in turning off the synchronous rectification MOSFET, thereby resulting in a high transient current known as "shoot-through." Such shoot-through may cause failure of the primary flyback MOSFET.

To address the foregoing problems, some systems have used low voltage integrated circuit technology that requires the placement of a resistor between the synchronous rectification MOSFET drain and the sensing input. Since this resistor is typically on the order of 100 kiloohms (kΩ), the input capacitance of the integrated circuit, which is in the order of 1 picofarad (pF), creates an unacceptable delay. The synchronous rectification application may require detection of drain to source voltage and switching on or off of the MOSFET within less than 50 nanoseconds (ns). As such, more predictive techniques to determine when to switch the synchronous rectification MOSFET on and off are needed.

Some systems may use a fixed off time blanking period that can be set by an external resistor. However this blanking time cannot be too long otherwise it would prevent the synchronous rectification controller from arming under heavy load conditions leading to skipped synchronous rectification cycles. Such skipped synchronous rectification cycles may occur at second or third ringing oscillations that occur after the blanking period, which may cause false triggering.

Some systems may use a sample and hold technique, which detects the drain voltage plateau during the primary on time and holds this value. This plateau is proportional to the rectified line input voltage. In order to arm the synchronous rectification for the next cycle the drain voltage typically must reach a level above 80% to 90% of the rectified line input voltage from the previous cycle, which is normally at higher level than that of the ringing oscillations. Under low line conditions ringing voltage can exceed 80% to 90% of the stored voltage. A fixed delay could be implemented, however this restricts the synchronous rectification controller to lower switching frequency ranges.

Some systems may use a volt-second balancing technique to determine a correct switch off time in DCM and CCM. Such volt-second balancing techniques may involve integrating the reflected drain voltage each switching cycle to determine the volt-seconds and calculating the synchronous rectification conduction time based on dividing the volt-seconds by the output voltage to achieve volt-seconds balance. Controllers tested that employ this technique are typically very sensitive to switching noise, which may lead to severe false triggering and incorrect operation. In some instances, it has not been possible to overcome this problem by adding capacitors or optimizing printed circuit board (PCB) layout.

To address the foregoing issues and shortcomings of some types of systems, in accordance with one or more techniques described herein, a system for synchronous rectification control may include a resistor to detect a drain to source voltage at a synchronous rectifier and may be configured to convert the detected drain to source voltage into two separate voltage signals: an arming signal; and a triggering signal. The input detection is implemented in such a way that no significant delay is caused by parasitic capacitance. This permits the synchronous rectification controller to accurately determine the correct points of switch on and switch off without using predictive methods.

One or more techniques described herein, may utilize a variation of sample/hold technique designed to operate from the arming signal. For example, a programmable delay may be added, which also reduces automatically with increasing drain voltage to provide "smart" arming able to operate correctly over a wider range of input voltage, load and switching frequency.

One or more techniques described herein, may use a timing process to determine a cycle time from the previous synchronous rectification switching cycle to set a maximum conduction cycle for the current switching cycle. This timing measurement may be made from the point of switch on to the point of arming. The synchronous rectification gate drive may be switched off (e.g., deactivated) by either: detection of when the negative drain to source voltage reaches a point close to zero; or when the conduction period reaches the period of the previous cycle minus a blanking period, which is proportional to the switching frequency. This may ensure that when operating in CCM the synchronous rectifier will switch off just before the start of a next primary switching cycle, thereby preventing shoot through.

FIG. 1 is a block diagram illustrating an example system 100 configured to control synchronous rectification, in accordance with one or more techniques of this disclosure. As illustrated in the example of FIG. 1, system 100 may include transformer 101, voltage source 102, capacitor 103, load 104, switch module 106, synchronous rectifier 108, control module 112, resistor 122, drain pin 123, parasitic capacitance 124, first current compensation module 129, and second current compensation module 139.

Voltage source 102 may be configured to provide electrical power to one or more other components of system 100. For instance, voltage source 102 may be configured to supply an input power to load 104. In some examples, voltage source 102 may include a battery which may be configured to store electrical energy. Examples of batteries may include, but are not limited to, nickel-cadmium, lead-acid, nickel-metal hydride, nickel-zinc, silver-oxide, lithium-ion, lithium polymer, any other type of rechargeable battery, or any combination of the same. In some examples, voltage source 102 may include an output of a power converter or power inverter. For instance, voltage source 102 may include an output of a direct current (DC) to DC power converter, an alternating current (AC) to DC power converter, and the like. In some examples, voltage source 102 may represent a connection to an electrical supply grid. In some examples, the input power signal provided by voltage source 102 may be a DC input power signal. For instance, in some examples, voltage source 102 may be configured to provide a DC input power signal in the range of ~5 VDC to ~40 VDC.

Load 104 may include devices configured to accept power supplied by voltage source 102. In some examples, load 104 may be a resistive load. Examples of resistive loads may include seat adjustment, auxiliary heating, window heating, light emitting diodes (LEDs), rear lighting, or other resistive loads. In other examples, load 104 may be an inductive load. Examples of inductive loads may include actuators, motors, and pumps used in one or more of a wiper system, anti-lock brake system (ABS), electronic braking system (EBS), relay, battery disconnect, fan, or other systems that include inductive loads. In still other examples, load 104 may be a capacitive load. Examples of capacitive loads may include lighting elements, such as a Xenon arc lamp. In yet other examples, loads may be combinations of resistive, inductive, and capacitive loads.

Switch module 106 may include any device suitable to control an amount of current flowing through switch module 106. More specifically, in some examples, switch module 106 may be configured to electrically couple, using a channel having a resistance, voltage source 102 and load 104 and to modify the resistance of the channel based on a control signal. Examples of switching elements may include, but are not limited to, a Field Effect Transistor (FET), Examples of FETs may include, but are not limited to, junction field-effect transistor (JFET), metal-oxide-semiconductor FET (MOSFET), dual-gate MOSFET, insulated-gate bipolar transistor (IGBT), any other type of FET, or any combination of the same. Examples of MOSFETS may include, but are not limited to, enhancement mode NMOS, double-diffused MOSFET (DMOS), or any other type of MOSFET, or any combination of the same. It should be understood that switching elements may be a high side or low side. Additionally, switching elements may be voltage-controlled and/or current-controlled. Examples of current-controlled switching elements may include, but are not limited to, gallium nitride (GaN) MOSFETs or other current-controlled elements. Switch module 106 may include a power converter controller (not shown) or may be controlled by a power converter controller (not shown). For example, the power converter controller may provide a pulse width modulation signal to selectively activate switch module 106 to control a voltage, current, and/or power output to load 104.

Synchronous rectifier 108 may comprise any device suitable to perform synchronous rectification. More specifically, in some examples, synchronous rectifier 108 may be configured to modify a resistance of a channel to permit current to flow in a forward direction and prevent current from flowing from a reverse direction. Examples of a synchronous rectifier may include, but are not limited to, a Field Effect Transistor (FET), Examples of FETs may include, but are not limited to, junction field-effect transistor (JFET), metal-oxide-semiconductor FET (MOSFET), dual-gate MOSFET, insulated-gate bipolar transistor (IGBT), any other type of FET, or any combination of the same. It should be understood that synchronous rectifiers may be voltage-controlled and/or current-controlled. Examples of current-controlled synchronous rectifiers may include, but are not limited to, gallium nitride (GaN) MOSFETs, or other current-controlled elements.

Control module 112 may be configured to control synchronous rectifier 108. For example, control module 112 may receive a triggering signal from first current compensation module 129 and an arming signal from second current compensation module 139. In this example, control module 112 may activate synchronous rectifier 108 using the triggering signal and arming signal. In some examples, control module 112 may be a microcontroller on a single integrated circuit containing a processor core, memory, inputs, and outputs. For example, control module 112 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, control module 112 may be a combination of one or more analog components and one or more digital components.

System 100 may include a flyback converter. For example, as shown, switch module 106 may activate to couple voltage source 102 to transformer 101 to increase a magnetic flux in transformer 101. In this example, the magnetic flux in transformer 101 provides power to capacitor 103 and load 104. Although FIG. 1, illustrates synchronous rectifier 108 as being arranged in a flyback converter, it should be understood that synchronous rectifier 108 may be arranged in other power converters. For instance, synchronous rectifier 108 may be arranged in a buck-boost converter.

Parasitic capacitance 124 may represent input capacitance of an integrated circuit that includes first current compensation module 129 and second current compensation module 139. Parasitic capacitance 124 may include parasitic capacitance from drain pin 123, traces at a printed circuit board housing system 100, connections with the integrated circuit that includes first current compensation module 129 and second current compensation module 139, and other parasitic capacitance of system 100. Parasitic capacitance 124 may have a capacitance of between 0.01 picofarads (pF) and 100 picofarads (pF). For example, parasitic capacitance 124 may have a capacitance on the order of 1 picofarad (pF).

Resistor 122 may permit use of low voltage integrated circuit technology. Resistor 122 may have a resistance of between 1 kiloohm (kΩ) and 10 megaohms (MΩ). For instance, resistor 122 may have a resistance on the order of 100 kiloohms (kΩ). As such, parasitic capacitance 124, which may be on the order of 1 picofarad (pF), may create a significant delay when charging and discharging.

First current compensation module 129 may be configured to provide current 127 into parasitic capacitance 124 when a drain of synchronous rectifier 108 draws current from parasitic capacitance 124. For example, first current compensation module 129 may provide current 127 into parasitic capacitance 124 such that current 127 corresponds to (e.g., is equal, approximately equal, etc.) the current drawn from parasitic capacitance 124 by synchronous rectifier 108. In this way, first current compensation module 129 may prevent parasitic capacitance 124 from adding delay for charging the parasitic capacitance. In some examples, first current compensation module 129 may generate a triggering signal using current 127. For example, first current compensation module 129 may generate a triggering signal that is proportional to current 127.

Second current compensation module 139 may be configured to draw current 137 from parasitic capacitance 124 when a drain of synchronous rectifier 108 provides current into parasitic capacitance 124. For example, second current compensation module 139 may draw current 137 from parasitic capacitance 124 such that current 137 corresponds to (e.g., is equal, approximately equal, etc.) the current provided by synchronous rectifier 108 into parasitic capacitance 124. In this way, second current compensation module 139 may prevent parasitic capacitance 124 from adding delay for discharging the parasitic capacitance. In some examples, second current compensation module 139 may generate an arming signal using current 137. For example, second current compensation module 139 may generate the arming signal to be proportional to current 137.

In accordance with one or more techniques described, first current compensation module 129 provides current 127 into parasitic capacitance 124 at drain pin 123 when a drain of synchronous rectifier 108 draws current from parasitic capacitance 124. Drain pin 123 is coupled to the drain of synchronous rectifier 108 via resistor 122. First current compensation module 129 further generates a triggering signal using current 127. Second current compensation module 139 draws current 137 from parasitic capacitance 124 when the drain of synchronous rectifier 108 provides current into parasitic capacitance 124 and generates an arming signal using current 137. Control module 112 activates synchronous rectifier 108 using the triggering signal and the arming signal.

Figure 2:
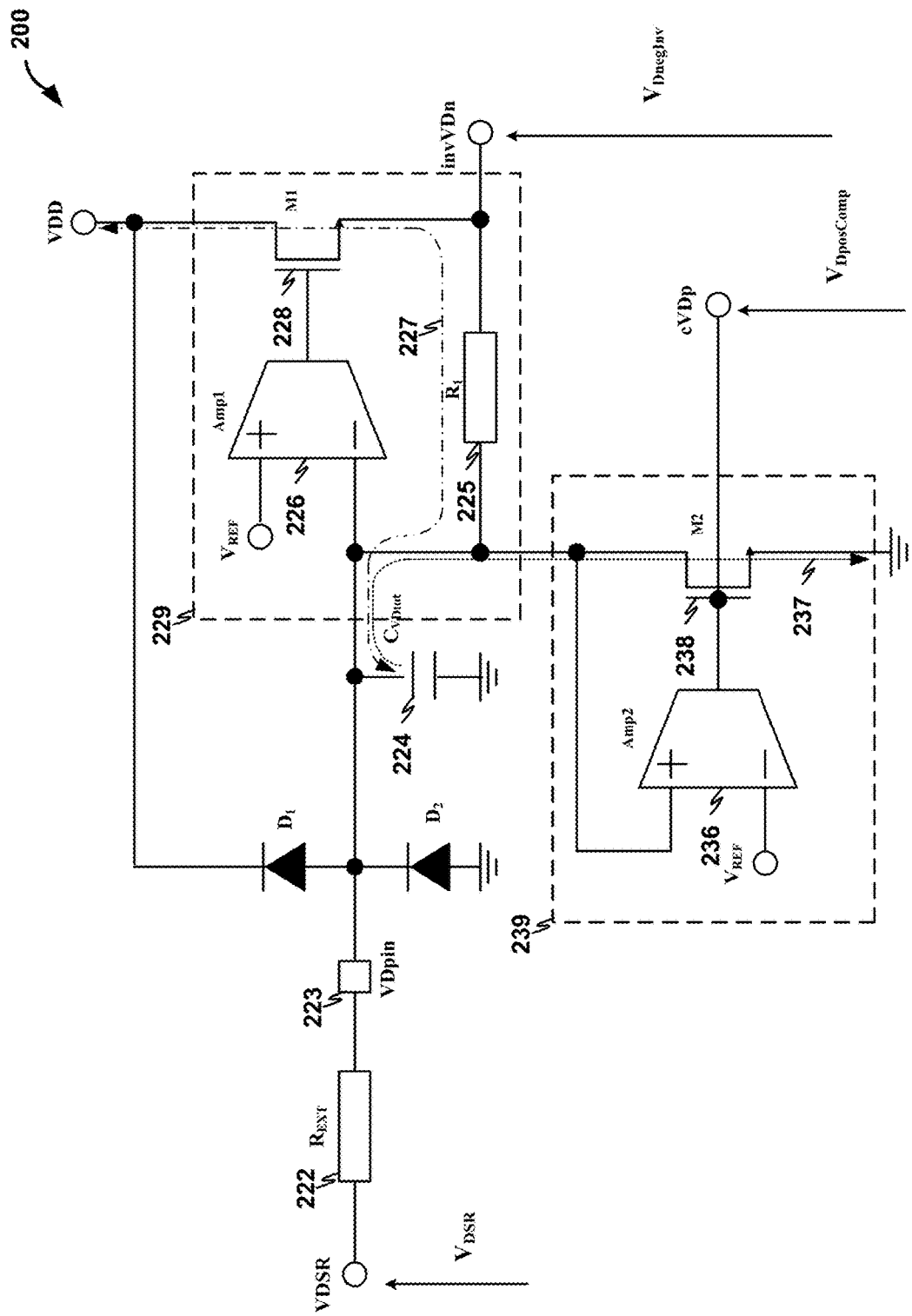
FIG. 2 is a circuit diagram illustrating an example first current compensation module and an example second current compensation module, in accordance with one or more techniques of this disclosure.

FIG. 2 is a circuit diagram illustrating an example first current compensation module 229 and an example second current compensation module 239, in accordance with one or more techniques of this disclosure. As illustrated, circuit 200 includes resistor 222, drain pin 223, parasitic capacitance 224, first current compensation module 229, and second current compensation module 239. Resistor 222 ('REXT') may be an example of resistor 122 of FIG. 1. For instance, resistor 222 may have a resistance on the order of 100 kiloohms (kΩ). Parasitic capacitance 224 may be an example of parasitic capacitance 124 of FIG. 1. For instance, parasitic capacitance 224 may have a capacitance on the order of 1 picofarad (pF).

First current compensation module 229 may include wide bandwidth operational amplifier 226, switching element 228, and feedback resistor 225. As shown, a non-inverting input of wide bandwidth operational amplifier 226 is coupled to a voltage reference ('VREF'). An inverting input of wide bandwidth operational amplifier 226 is coupled to drain pin 223. An output of wide bandwidth operational amplifier 226 is coupled to a control node (e.g., gate) of switching element 228.

Switching element 228 is configured to modify, based on a control signal received at the control node of switching element 228, a resistance of a channel that electrically connects an input voltage ('VDD') to a first side of feedback resistor 225. In some examples, the input voltage ('VDD') is greater than the voltage reference ('VREF'). In this example, a second side of feedback resistor 225 is coupled to drain pin 223. In some examples, feedback resistor 225 has a resistance value corresponding to resistor 222. In this way, first current compensation module 229 may provide current 227 into parasitic capacitance 224 at drain pin 223 when a voltage at drain pin 223 is less than the voltage reference ('VREF'). In this example, first current compensation module 229 may generate a triggering signal at the first side of feedback resistor 225.

Second current compensation module 239 may include wide bandwidth operational amplifier 236 and switching element 238. As shown, an inverting input of wide bandwidth operational amplifier 236 is coupled to the voltage reference ('VREF'). A non-inverting input of wide bandwidth operational amplifier 236 is coupled to drain pin 223. An output of wide bandwidth operational amplifier 236 is coupled to a control node (e.g., gate) of switching element 238. In this example, second current compensation module 239 may generate an arming signal at the output of wide bandwidth operational amplifier 236.

Switching element 238 is configured to modify, based on the arming signal received at the control node of switching element 238, a resistance of a channel that electrically connects drain pin 223 to a reference node (e.g., ground) of the circuit. As used herein, a reference node may refer to a ground, earth reference, ground plane, or another reference node. For example, the reference node may be at a voltage that is less than the voltage reference ('VREF') and less than the input voltage ('VDD'). In this way, second current compensation module 239 may draw current 237 from parasitic capacitance 224 at drain pin 223 when a voltage at drain pin 223 is greater than the reference voltage.

Circuit 200 operates by cancelling current flowing through resistor 222 into drain pin 223. As shown, two separate branches of circuit 200 are based around two wide band width operational amplifiers (e.g., 226 and 236) that operate either when the input current is positive or negative. Because the voltage at drain pin 223 may be held at a voltage reference ('VREF') with very little variation parasitic capacitance 224 may have no significant effect on the performance of circuit 200.

Figure 3:
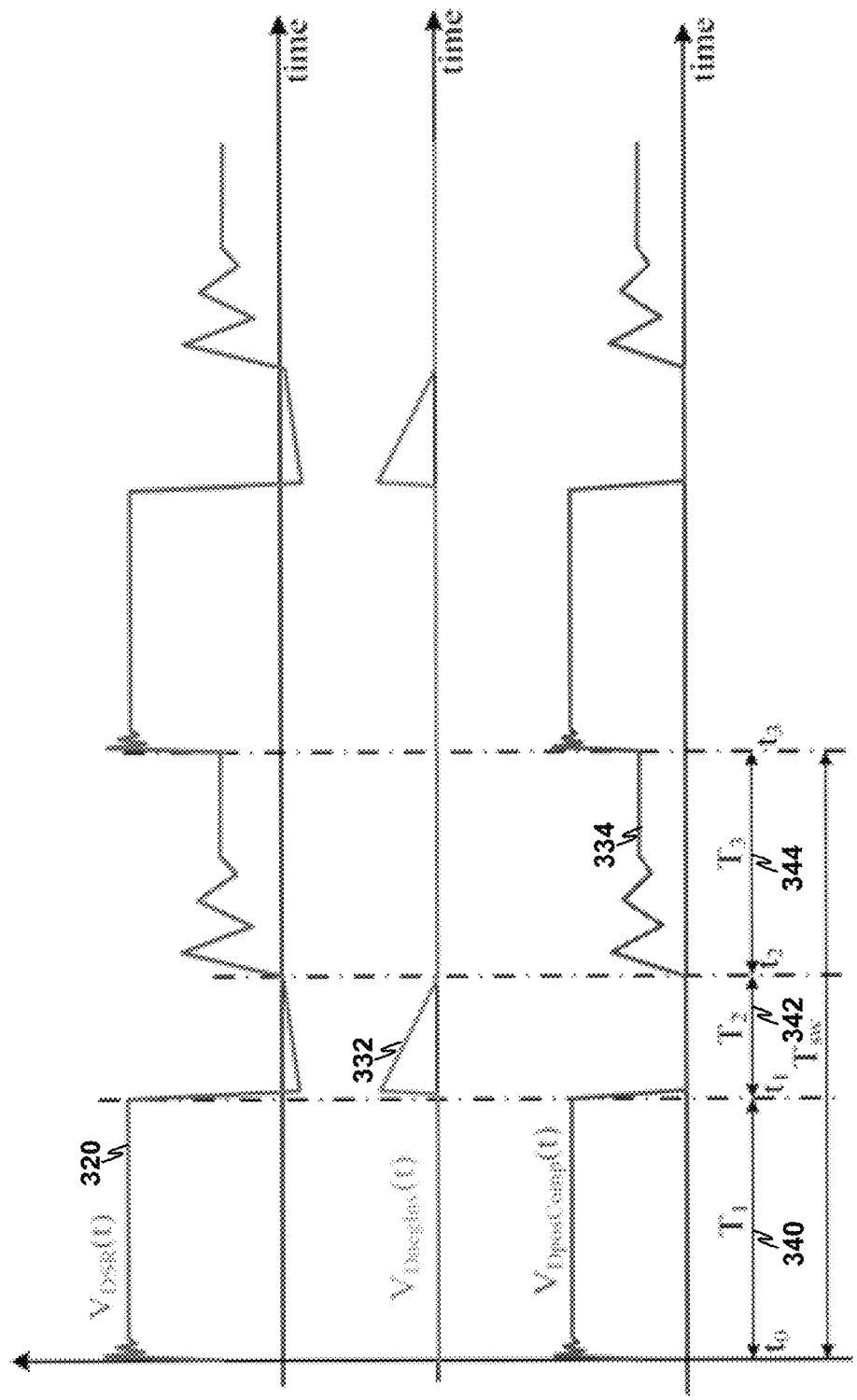
FIG. 3 is a graphical illustration of a performance of the first current compensation module and the second current compensation module of FIG. 2, in accordance with one or more techniques of this disclosure.

FIG. 3 is a graphical illustration of a performance of first current compensation module 229 and second current compensation module 239 of FIG. 2, in accordance with one or more techniques of this disclosure. The abscissa axis (e.g., horizontal) of FIG. 3 represents time and the ordinate axis (e.g., vertical) of FIG. 3 represents drain to source voltage 320 ('VDSR'), a voltage of triggering signal 332, and a voltage of arming signal 334. FIG. 3 is discussed with respect to system 100 of FIG. 1 and circuit 200 of FIG. 2 for exemplary purposes only.

In the example of FIG. 3, a synchronous rectifier (e.g., 108) has drain to source voltage 320 ('VDSR'). In this example, first current compensation module 229 generates triggering signal 332 ('VDnegInv') and second current compensation module 239 generates arming signal 334 ('VDposComp').

In the example of FIG. 3, triggering signal 332 is a voltage proportional to the negative input current with a gain determined by feedback resistor 225 ('R1'), which may have a resistance that is matched to the value of resistor 222 ('REXT'). The arming signal 334 is a voltage proportional to the square root of the input current at synchronous rectifier 108. The arming signal 334 may be used as an input to a smart arming circuit based on one or more sample and hold techniques described herein.

During time range 340 ('T1'), control module 112 operates in an armed state where synchronous rectifier 108 is deactivated. At the end ('t1') of time range 340, control module 112 determines, using triggering signal 332, to operate in an activated state, where synchronous rectifier 108 is activated. For instance, control module 112 may determine, using triggering signal 332, that a negative drain to source voltage at synchronous rectifier 108 exceeds zero.

At the beginning ('t1') of time range 342 ('T2'), control module 112 operates in an activated state where synchronous rectifier 108 is activated. At the end ('t2') of time range 342, control module 112 determines, using triggering signal 332, to operate in a deactivated state, where synchronous rectifier 108 is deactivated. For example, control module 112 may determine, using triggering signal 332, that a negative drain to source voltage at synchronous rectifier 108 corresponds to zero.

At the beginning ('t2') of time range 344 ('T3'), control module 112 operates in a deactivated state where synchronous rectifier 108 is deactivated. For instance, switch module 106 may be deactivated. Although FIG. 3 illustrates a triangular ripple, it should be understood that the ripple of arming signal 334 during time range 344 may be sinusoidal.

At the end ('t3') of time range 344, control module 112 determines, using arming signal 334, to operate in an armed state, where synchronous rectifier 108 is deactivated but ready to be activated. For example, control module 112 may determine, using arming signal 334, that a negative drain to source voltage at synchronous rectifier 108 has a plateau voltage exceeding a threshold plateau voltage. The process illustrated during time ranges 340-344 may repeat for each time synchronous rectifier 108 is activated.

Figure 4:
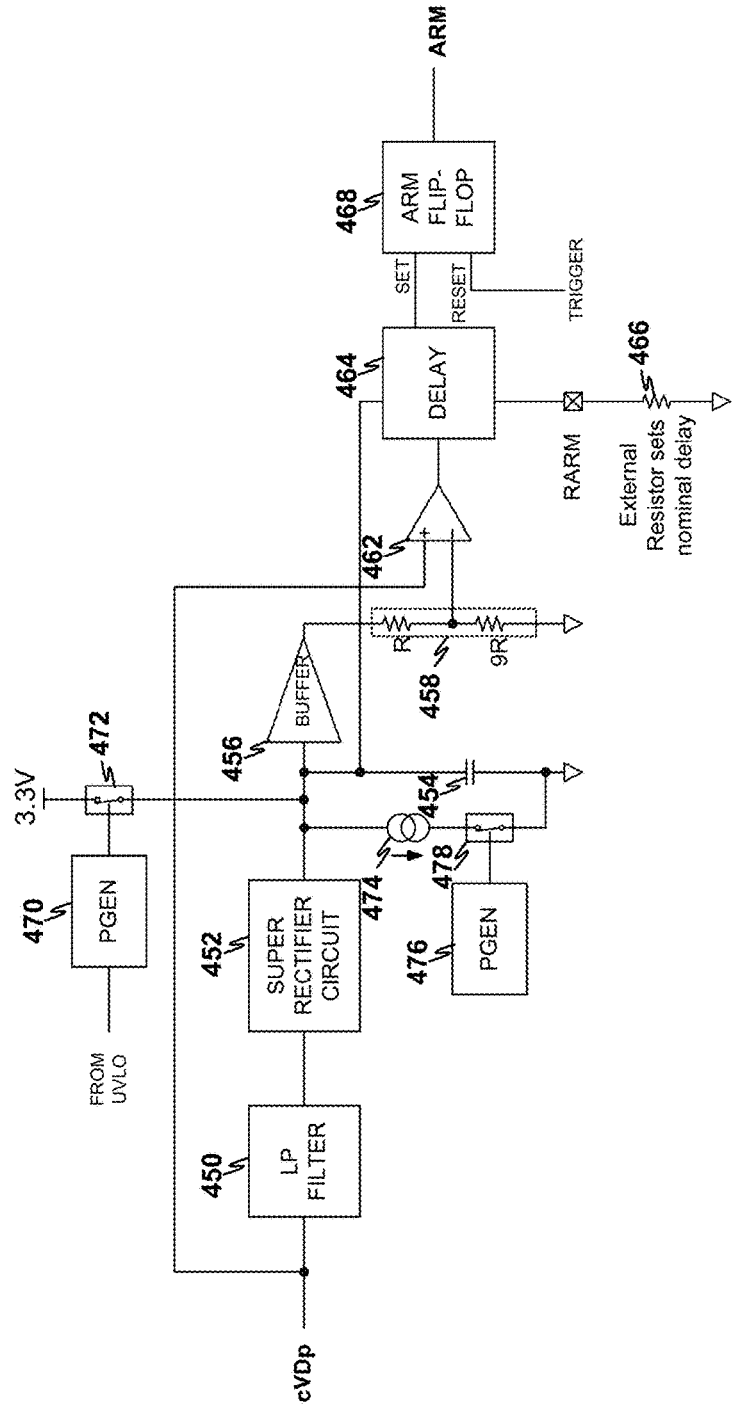
FIG. 4 is a circuit diagram illustrating an example arming module, in accordance with one or more techniques of this disclosure.

FIG. 4 is a circuit diagram illustrating an example arming module 400, in accordance with one or more techniques of this disclosure. As illustrated, arming module 400 may include low pass filter 450, super rectifier circuit 452, sample/hold capacitor 454, buffer 456, voltage divider 458, comparator 462, delay module 464, external resistor 466, flip-flop 468, pulse generator 470 ('PGEN'), switching element 472, current source 474, pulse generator 476 ('PGEN'), and switching element 478. FIG. 4 is discussed with reference to FIG. 1 for illustrative purposes only.

In the example of FIG. 4, triggering (e.g., operating in an activated state) cannot occur unless system 100 has been previously armed (e.g., is operating in an armed state). The sample/hold capacitor 454 holds a direct current (DC) voltage level proportional to the square root of the plateau voltage. This is sampled by the super rectifier circuit 452 which is operated at the point of arming to avoid over charging due to ringing oscillations. Low pass filter 450 (e.g., a small RC filter) is also included to minimize these leading edge spikes as much as possible. In addition, there is some series resistance included in the sample/hold capacitor charging path.

Voltage divider 458 converts the sample/hold capacitor voltage at sample/hold capacitor 454 to a voltage proportional to 90% of the voltage, allowing for the square root characteristic of the arming signal. Comparator 462 compares the voltage proportional to 90% of the sample/hold capacitor voltage to the filtered arming signal to detect when this exceed 90% of the previous cycle. The output from comparator 462 may remain high for longer than the arming delay (set by external resistor 466) to allow the arming signal to go high. This signal allows the synchronous rectification gate drive to be triggered (e.g., operated in an activated state) by detection of the trigger signal.

A lockout signal may be generated to keep the gate drive off until system 100 has initialized (e.g., during a start-up state). The sample/hold capacitor 454 is initially pulled to a regulated voltage (e.g., 3 Volts (V)) and slowly discharges until the arming voltage exceeds 90% of the voltage at sample/hold capacitor 454 for the first time. This prevents the possibility of false triggering occurring during start-up and initialization of system 100.

More specifically, for example, delay module 464 may determine a threshold arming delay based on a voltage at external resistor 466 and the current plateau voltage of the arming signal. In this example, delay module 464 may compare a current arming delay to the threshold arming delay to determine to operate in the armed state only in response to determining that the current arming delay exceeds the threshold arming delay. In some examples, delay module 464 may be a microcontroller on a single integrated circuit containing a processor core, memory, inputs, and outputs. In some examples, delay module 464 may be one or more analog components. In some examples, delay module 464 may be a combination of one or more analog components and one or more digital components.

Low pass filter 450 is configured to filter the previous plateau voltage using a low-pass filter function to generate a filtered previous plateau voltage. Super rectifier circuit 452 is configured to sample the filtered previous plateau voltage to generate a sampled previous plateau voltage. Sample/hold capacitor 454 is configured to store the sampled previous plateau voltage. Voltage divider 458 is configured to generate the voltage indicative of the threshold plateau voltage using the sampled previous plateau voltage stored at sample/hold capacitor 454. For example, as shown, voltage divider 458 is configured to generate the voltage indicative of the threshold plateau voltage to be 90% of the sampled previous plateau voltage stored at sample/hold capacitor 454.

Delay module 464 is configured to output a set value when the current plateau voltage exceeds the voltage indicative of the threshold plateau voltage and when the current arming delay exceeds the threshold arming delay. Flip-flop 468 is configured to store the set value from delay module 464 until a reset value is received. Arming module 400 determines that the current arming delay exceeds the threshold arming delay and that the current plateau voltage exceeds the threshold plateau voltage when flip-flop 468 is storing the set value.

Pulse generator 470 is configured to activate, during a start-up state, switching element 472 that couples sample/hold capacitor 454 to a regulated voltage (e.g., 3.3 volts) such that sample/hold capacitor 454 has a voltage corresponding to the regulated voltage during the start-up state. In some examples, pulse generator 470 may be a microcontroller on a single integrated circuit containing a processor core, memory, inputs, and outputs. In some examples, pulse generator 470 may be one or more analog components. In some examples, pulse generator 470 may be a combination of one or more analog components and one or more digital components.

Pulse generator 476 is configured to activate, during the start-up state, switching element 478 to couple sample/hold capacitor 454 to regulated current output by current source 474 such that sample/hold capacitor 454 is discharging during the start-up state. In some examples, pulse generator 476 may be a microcontroller on a single integrated circuit containing a processor core, memory, inputs, and outputs. In some examples, pulse generator 476 may be one or more analog components. In some examples, pulse generator 476 may be a combination of one or more analog components and one or more digital components.

In this way, arming module 400 may be configured to generate a voltage indicative of a threshold plateau voltage, the voltage indicative of the threshold plateau voltage being based on a previous plateau voltage of the arming signal. The arming module 400 may be further configured to compare a current plateau voltage of the arming signal to the threshold plateau voltage to operate in the armed state only in response to determining that the current plateau voltage of the arming signal exceeds the threshold plateau voltage. For example, arming module 400 may to be configured operate in the armed state in response to determining that the current arming delay exceeds the threshold arming delay and in response to determining that the current plateau voltage exceeds the threshold plateau voltage.

Figure 5:
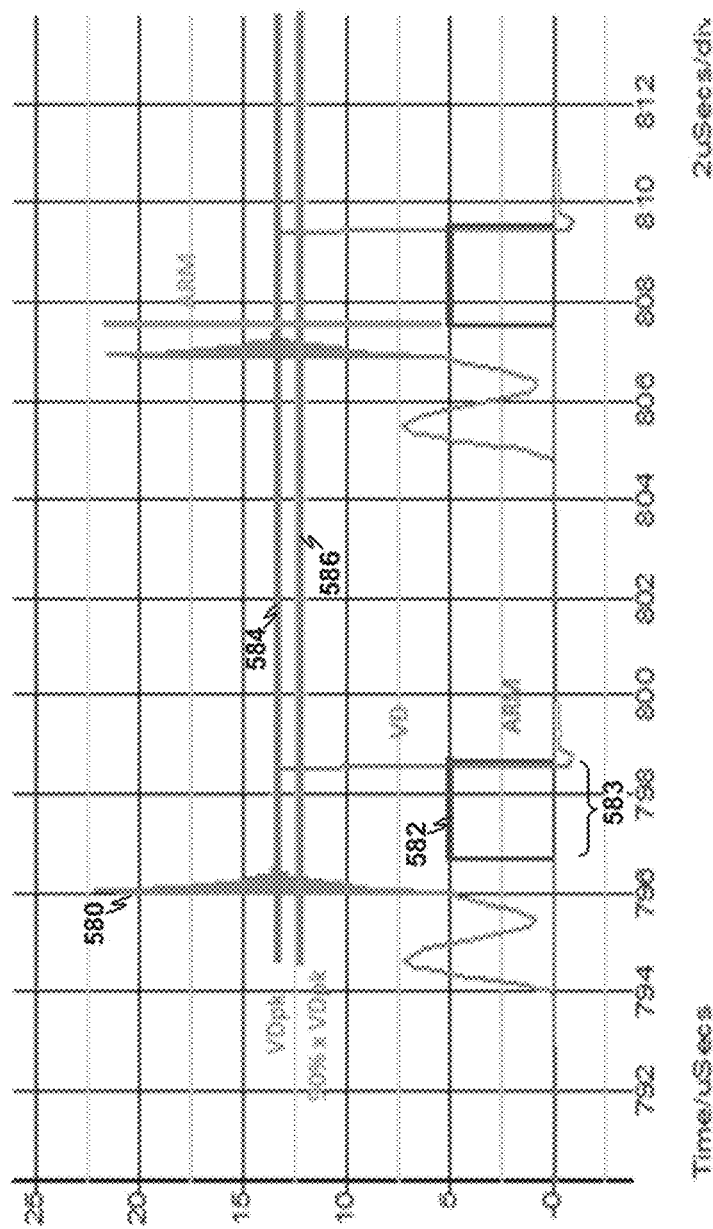
FIG. 5 is a graphical illustration of a performance of the arming module of FIG. 4, in accordance with one or more techniques of this disclosure.

FIG. 5 is a graphical illustration of a performance of arming module 400 of FIG. 4, in accordance with one or more techniques of this disclosure. The abscissa axis (e.g., horizontal) of FIG. 5 represents time in microseconds (μs) and the ordinate axis (e.g., vertical) of FIG. 5 represents a voltage of drain signal 580 and a voltage of arming signal 582. FIG. 5 is discussed with respect to system 100 of FIG. 1 and arming module 400 of FIG. 4 for exemplary purposes only.

In the example of FIG. 5, drain signal 580 represents the synchronous rectifier drain to source voltage. The plateau voltage 584 and a voltage equal to 90% of this voltage is shown as threshold plateau voltage 586. Arming occurs when drain signal 580 exceeds the threshold plateau voltage 586 for a period of time known as the arming delay (TARM). For example, arming signal 582 indicates that synchronous rectifier 108 is operating in an armed state at time range 583.

Unlike other techniques, one or more techniques described herein do not use a voltage directly proportional to the synchronous rectifier drain to source voltage but instead use an arming signal output by second current compensation module 139, which is proportional to the square root of the synchronous rectifier drain to source voltage. In addition, one or more techniques described herein include a variable arming delay that is set by an external resistor (e.g., external resistor 466 of FIG. 4) and adjusts depending on the level of the plateau voltage at drain signal 580. This allows greater flexibility and the ability, in conjunction with the drain voltage detection circuit described in FIG. 2, to operate up to switching frequencies of 500 kilohertz (kHz).

Additional features may include: start-up blanking to prevent false arming during the start-up phase of arming module 400 before the arming signal has been sampled; and a slow discharge of the held plateau voltage to prevent the held plateau voltage from remaining higher than the actual voltage after any change in input, for more than a small number of switching cycles.

Figure 6:
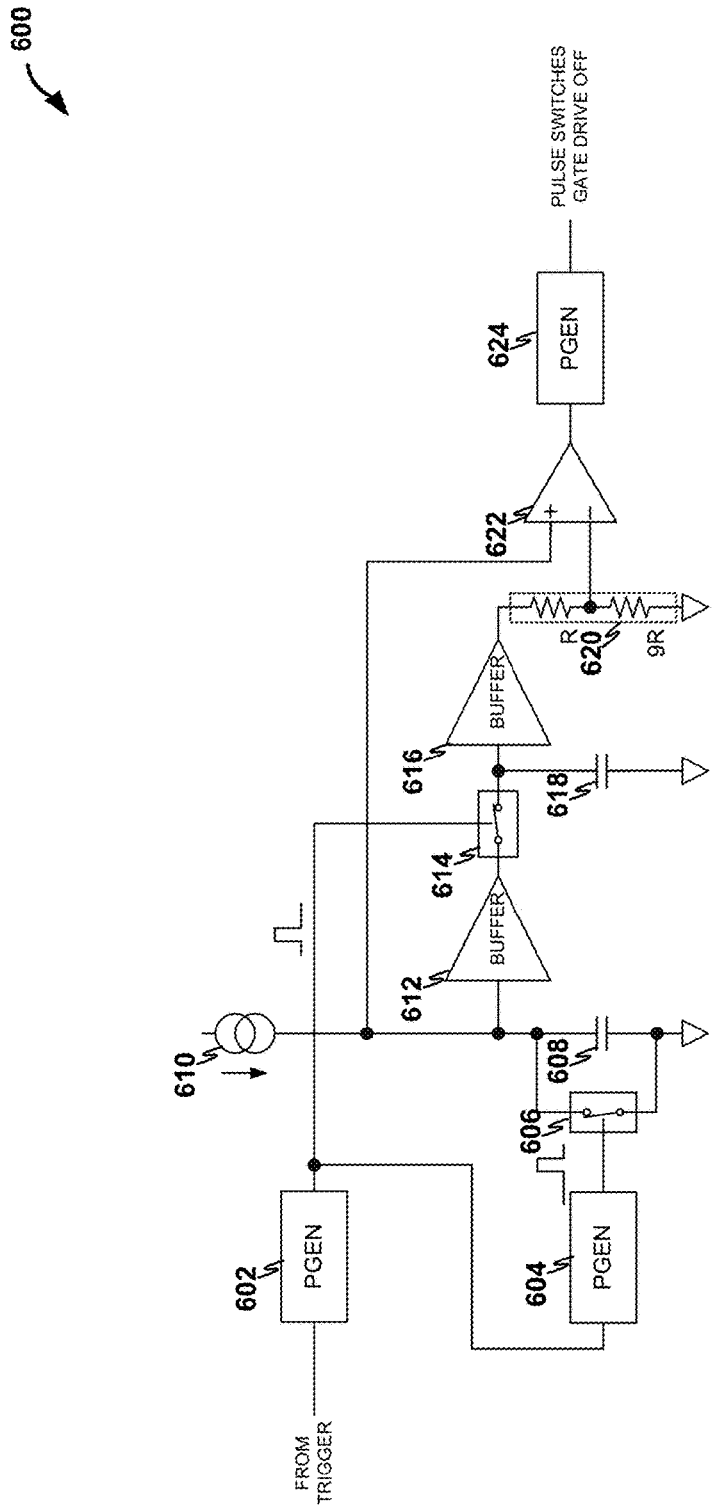
FIG. 6 is a circuit diagram illustrating an example continuous conduction mode module, in accordance with one or more techniques of this disclosure.

FIG. 6 is a circuit diagram illustrating an example continuous conduction mode module 600, in accordance with one or more techniques of this disclosure. As illustrated, continuous conduction mode module 600 may include pulse generator 602 ('PGEN'), pulse generator 604 ('PGEN'), switching element 606, ramp capacitor 608, current source 610, buffer 612, switching element 614, buffer 616, timer capacitor 618, voltage divider 620, comparator 622, and pulse generator 624 ('PGEN'). FIG. 6 is discussed with reference to FIG. 1 for illustrative purposes only.

In the example of FIG. 6, current source 610 is configured to output a regulated current. Ramp capacitor 608 is configured to receive the regulated current from current source 610. A voltage at ramp capacitor 608 indicates the previous activation duration. Pulse generator 602 is configured to activate, based on the triggering signal, switching element 614 that couples ramp capacitor 608 to timer capacitor 618 such that timer capacitor 618 has a voltage corresponding to a voltage at ramp capacitor 608. For instance, in response to receiving a first pulse from the triggering signal, pulse generator 602 may activate switching element 614 to transfer voltage from ramp capacitor 608 to timer capacitor 618 such that timer capacitor 618 holds the synchronous rectifier gate on time value from the previous cycle. Voltage divider 620 is configured to receive the voltage at timer capacitor 618 and to output the voltage indicative of the threshold activation duration.

Pulse generator 604 is configured to activate, based on the triggering signal, after the first pulse generating activates switching element 606, a second switching element that discharges ramp capacitor 608. In this way, a voltage at ramp capacitor 608 after discharging the ramp capacitor may indicate the current activation duration. For instance, in response to receiving a second pulse from the triggering signal, pulse generator 604 may activate switching element 606 to discharge ramp capacitor 608 to zero voltage such that a voltage at ramp capacitor 608 is proportional to synchronous rectifier gate drive on time. Comparator 622 is configured to output a value for deactivating synchronous rectifier 108 of FIG. 1 when the voltage at ramp capacitor 608 exceeds the voltage indicative of the threshold activation duration. Pulse generator 624 is configured to deactivate synchronous rectifier 108 of FIG. 1 in response to receiving the value for deactivating synchronous rectifier 108 from comparator 622.

In this way, continuous conduction mode module 600 is configured to generate a voltage indicative of a threshold activation duration. The voltage indicative of the threshold activation duration being based on a previous activation duration of the synchronous rectifier from a point of switch-on (e.g., activation) to a point of arming. In this example, continuous conduction mode module 600 is further configured to deactivate the synchronous rectifier when a current activation duration of the synchronous rectifier exceeds the threshold activation duration.

Figure 7:
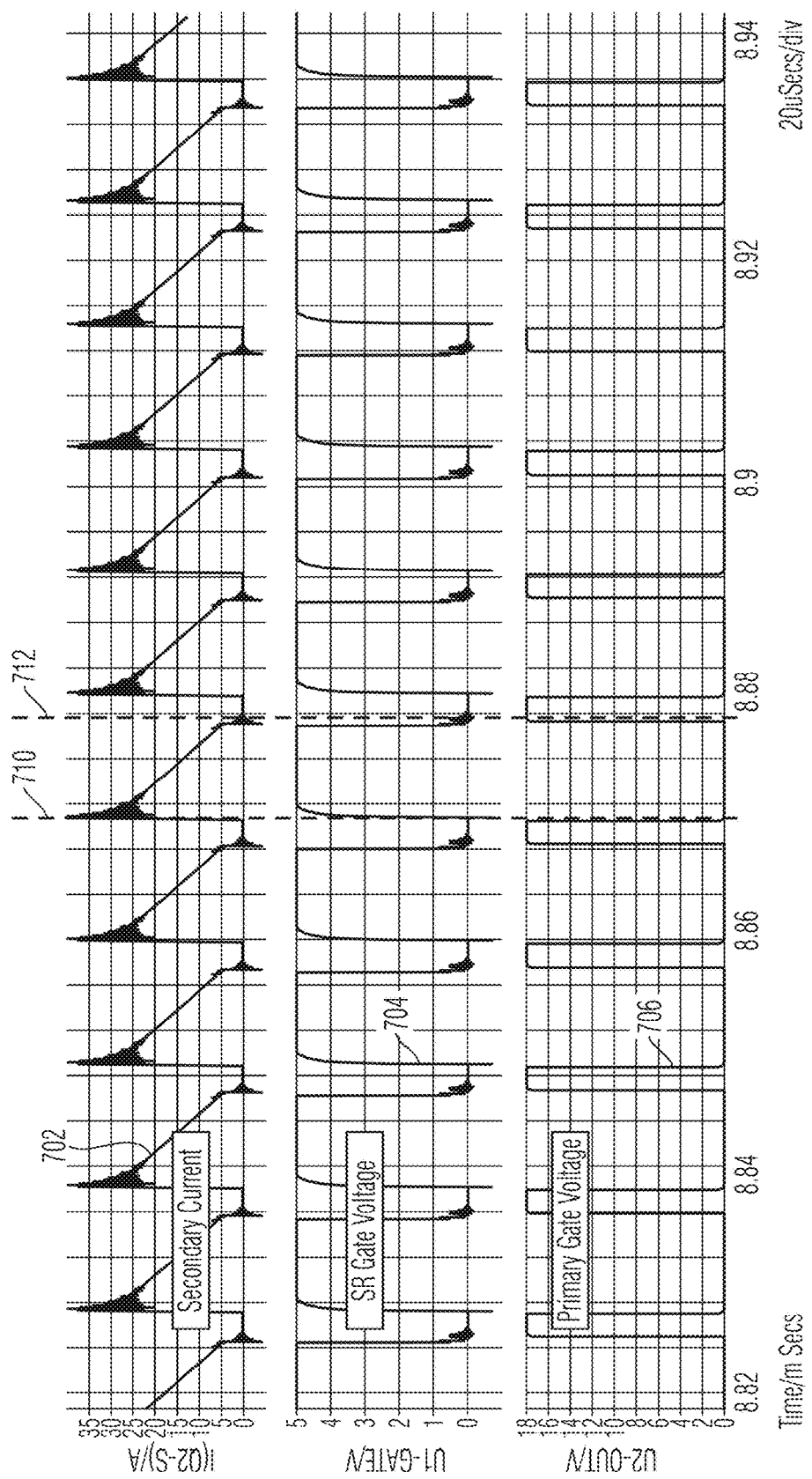
FIG. 7 is a graphical illustration of a performance of the continuous conduction mode module of FIG. 6, in accordance with one or more techniques of this disclosure.

FIG. 7 is a graphical illustration of a performance of the continuous conduction mode module 600 of FIG. 6, in accordance with one or more techniques of this disclosure. The abscissa axis (e.g., horizontal) of FIG. 7 represents time in milliseconds (ms). The ordinate axis (e.g., vertical) of FIG. 7 represents a voltage for synchronous rectifier gate voltage 704 and primary gate voltage 706 and a current for secondary current 702. FIG. 7 is discussed with respect to system 100 of FIG. 1 and continuous conduction mode module 600 of FIG. 6 for exemplary purposes only.

In the example of FIG. 7, at time 710, primary gate voltage 706 turns off and synchronous rectifier gate voltage 704 turns on. For example, switch module 106 deactivates and synchronous rectifier 108 activates. Further, at time 710, secondary current 702 begins to conduct (e.g., exceeds zero). As shown, at time 712, secondary current 702 has still not fallen to zero when the next switching cycle begins. In the example of FIG. 7, continuous conduction mode module 600 causes synchronous rectifier gate voltage 704 to turn off synchronous rectifier 108 before the primary gate (e.g., switch module 106) switches on to prevent synchronous rectifier 108 from being activated when switch module 106 activates, thereby preventing shoot through current.

Figure 8:
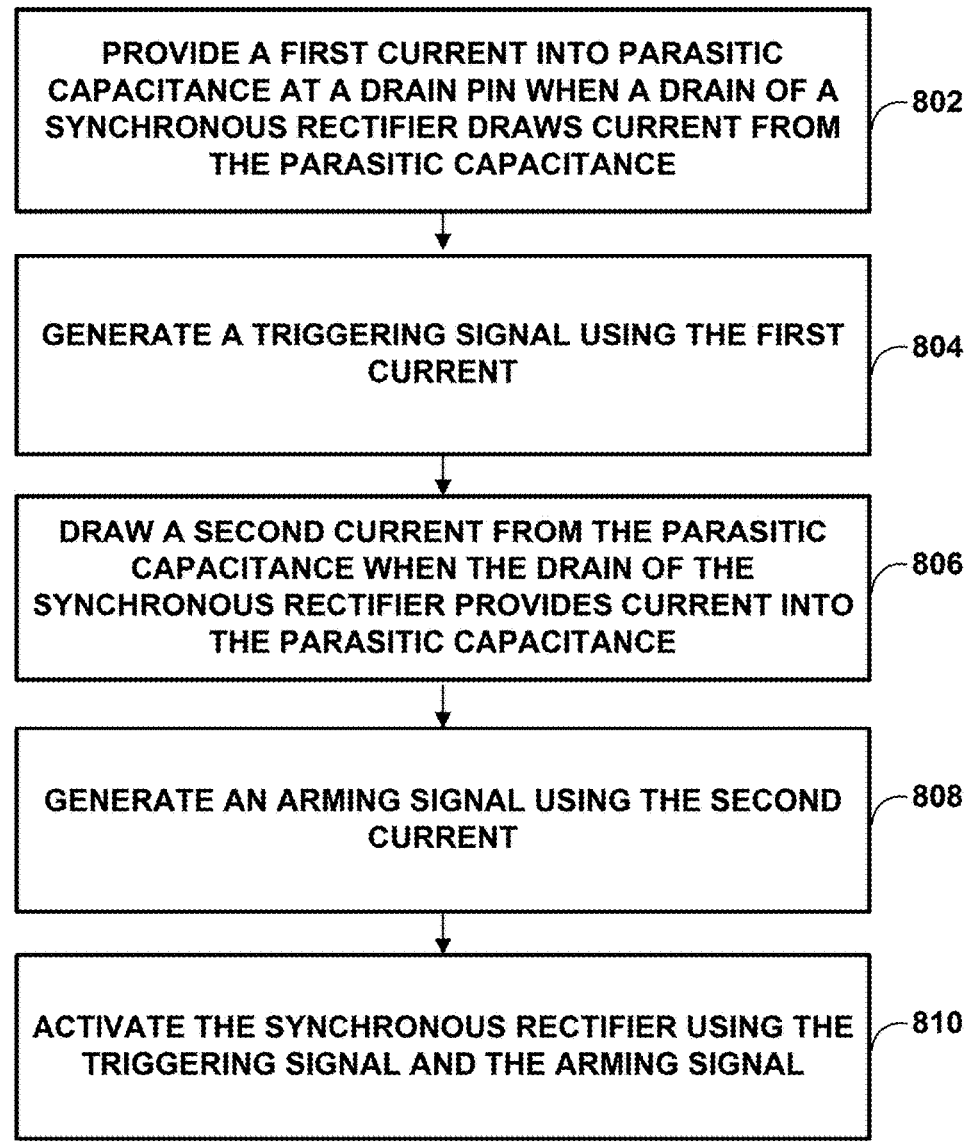
FIG. 8 is a flow diagram consistent with techniques for controlling synchronous rectification that may be performed by a circuit in accordance with this disclosure.

FIG. 8 is a flow diagram consistent with techniques for controlling synchronous rectification that may be performed by a circuit in accordance with this disclosure. For purposes of illustration only, the example operations are described below within the context of system 100 of FIG. 1, circuit 200 of FIG. 2, arming module 400 of FIG. 4, and continuous conduction mode module 600 of FIG. 6.

In accordance with one or more techniques of this disclosure, first current compensation module 129 provides current 127 into parasitic capacitance 124 at drain pin 123 when a drain of synchronous rectifier 108 draws current from parasitic capacitance 124 (802). First current compensation module 129 generates a triggering signal using current 127 (804). Second current compensation module 139 draws current 137 from parasitic capacitance 124 when the drain of synchronous rectifier 108 provides current into parasitic capacitance 124 (806). Second current compensation module 139 generates an arming signal using current 137 (808). Control module 112 activates synchronous rectifier 108 using the triggering signal and the arming signal (810).

Figure 9:
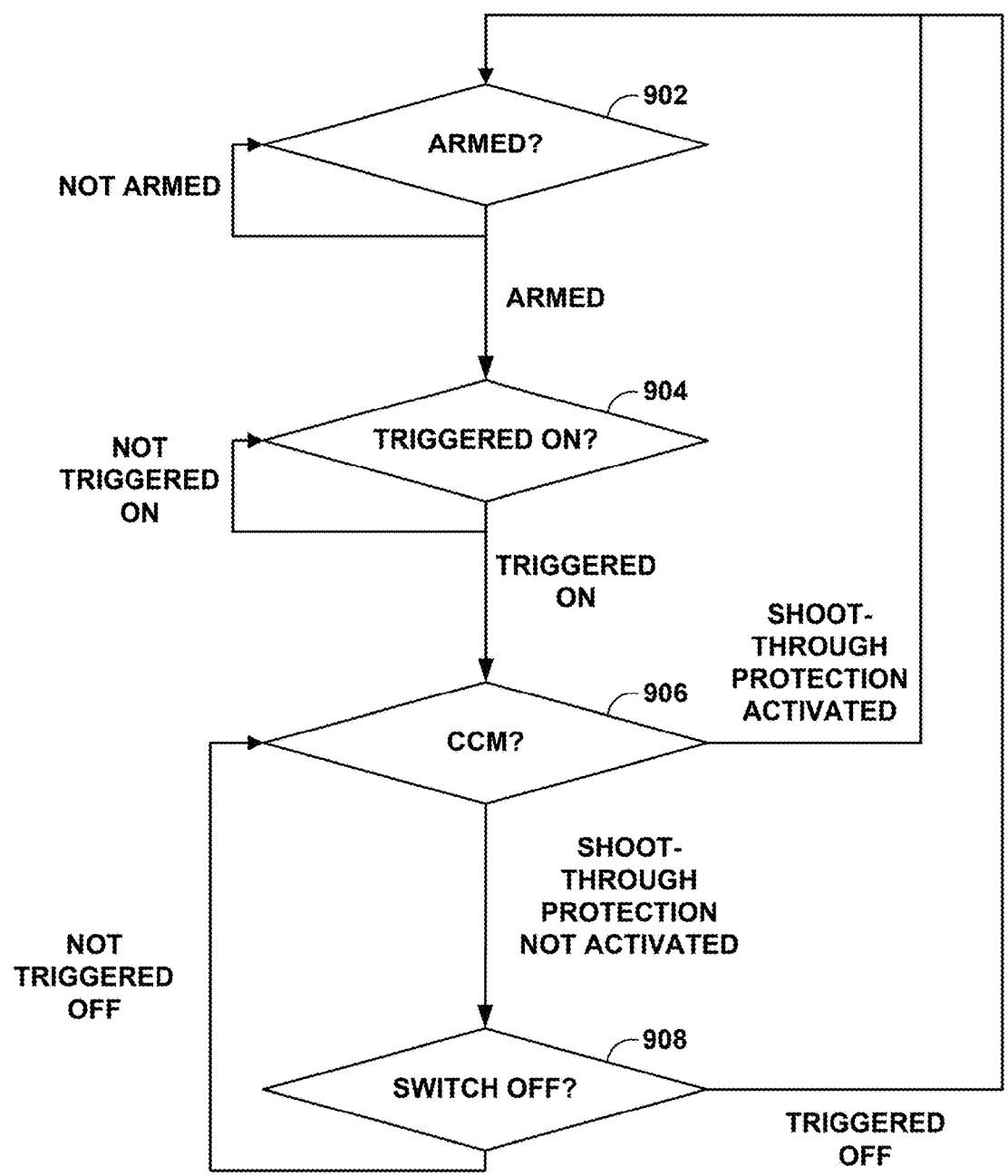
FIG. 9 is a flow diagram consistent with techniques for controlling an activation of a synchronous rectifier that may be performed by a circuit in accordance with this disclosure.

FIG. 9 is a flow diagram consistent with techniques for controlling an activation of a synchronous rectifier that may be performed by a circuit in accordance with this disclosure.

The following examples may illustrate one or more aspects of the disclosure. For purposes of illustration only, the example operations are described below within the context of system 100 of FIG. 1, circuit 200 of FIG. 2, arming module 400 of FIG. 4, and continuous conduction mode module 600 of FIG. 6.

In accordance with one or more techniques of this disclosure, arming module 400 determines, using an arming signal output by second current compensation module 139, whether to operate in an armed state when operating in a deactivated state (902). For example, arming module 400 may operate in the armed state in response to determining that the current arming delay exceeds the threshold arming delay and in response to determining that the current plateau voltage exceeds the threshold plateau voltage. Control module 112 is configured to deactivate synchronous rectifier 108 during the deactivated state and to deactivate synchronous rectifier 108 during the armed state. In response to determining not to operate in the armed state ("NOT ARMED" of 902), control module 112 remains in the deactivated state.

In response, however, to determining to operate in the armed state ("ARMED" of 902), a triggering module (e.g., control module 112) determines, using a triggering signal output by first current compensation module 129, whether to operate in an activated state when operating in the armed state (904). For example, in response to determining, using triggering signal 332, that a negative drain to source voltage at synchronous rectifier 108 exceeds zero, a triggering module of control module 112 may determine to operate in an activated state. Control module 112 is configured to activate synchronous rectifier 108 during the activated state. In response to determining not to operate in the activated state ("NOT TRIGGERED ON" of 904), the triggering module remains in the armed state.

In response, however, to determining to operate in the activated state ("TRIGGERED ON" of 904), continuous conduction mode module 600 determines whether to deactivate synchronous rectifier 108 (906). For example, continuous conduction mode module 600 determines to deactivate the synchronous rectifier when a current activation duration of the synchronous rectifier exceeds a threshold activation duration. In response to continuous conduction mode module 600 determining to deactivate synchronous rectifier 108 ("SHOOT-THROUGH PROTECTION ACTIVATED" of 906), continuous conduction mode module 600 deactivates synchronous rectifier 108.

In response, however, to continuous conduction mode module 600 determining not to deactivate synchronous rectifier 108, a triggering module (e.g., control module 112) determines, using the triggering signal output by first current compensation module 129, whether to operate in the deactivated state when operating in the activated state (908). For example, triggering module (e.g., control module 112) determines to operate in the deactivated state when a negative drain to source voltage at synchronous rectifier 108 corresponds to zero. In response, however, to triggering module determining to not to deactivate synchronous rectifier 108 ("NOT TRIGGERED OFF" of 908), 906 repeats. In response to triggering module 600 determining to deactivate synchronous rectifier 108 ("TRIGGERED OFF" of 908), triggering module 600 deactivates synchronous rectifier 108 and 902 repeats.

The following examples may illustrate one or more aspects of the disclosure.

Example 1

A circuit for controlling synchronous rectification, the circuit comprising: a first current compensation module configured to: provide a first current into parasitic capacitance at a drain pin when a drain of a synchronous rectifier draws current from the parasitic capacitance, wherein the drain pin is coupled to the drain of the synchronous rectifier via a resistor; and generate a triggering signal using the first current; a second current compensation module configured to: draw a second current from the parasitic capacitance when the drain of the synchronous rectifier provides current into the parasitic capacitance; and generate an arming signal using the second current; and a control module configured to activate the synchronous rectifier using the triggering signal and the arming signal.

Example 2

The circuit of example 1, wherein the first current compensation module comprises: a first wide bandwidth operational amplifier comprising a non-inverting input coupled to a voltage reference, an inverting input coupled to the drain pin, and an output; and a first switching element configured to modify, based on a control signal at the output of the first wide bandwidth operational amplifier, a resistance of a channel that electrically connects an input voltage to a first side of a feedback resistor, wherein a second side of the feedback resistor is coupled to the drain pin, wherein the feedback resistor has a resistance value corresponding to the resistor, and wherein the first switching element generates the triggering signal at the first side of the feedback resistor; and wherein the second current compensation module comprises: a second wide bandwidth operation amplifier comprising an inverting input coupled to the voltage reference, a non-inverting input coupled to the drain pin, and an output, wherein the second wide bandwidth operation amplifier generates the arming signal at the output of the second wide bandwidth operational amplifier; and a second switching element configured to modify, based on the arming signal, a resistance of a channel that electrically connects the drain pin to a reference node of the circuit.

Example 3

The circuit of any combination of examples 1-2, wherein the control module comprises: an arming module configured to determine, using the arming signal, whether to operate in an armed state when operating in a deactivated state, wherein the control module is configured to deactivate the synchronous rectifier during the deactivated state and wherein the control module is configured to deactivate the synchronous rectifier during the armed state; and a trigging module configured to: determine, using the triggering signal, whether to operate in an activated state when operating in the armed state, wherein the control module is configured to activate the synchronous rectifier during the activated state; and determine, using the triggering signal, whether to operate in the deactivated state when operating in the activated state.

Example 4

The circuit of any combination of examples 1-3, wherein, to determine whether to operate in the deactivated state, the triggering module is configured to determine, using the triggering signal, whether a negative drain to source voltage at the synchronous rectifier corresponds to zero.

Example 5

The circuit of any combination of examples 1-4, wherein, to determine whether to operate in the armed state, the arming module is configured to: generate a voltage indicative of a threshold plateau voltage, the voltage indicative of the threshold plateau voltage being based on a previous plateau voltage of the arming signal; and compare a current plateau voltage of the arming signal to the threshold plateau voltage.

Example 6

The circuit of any combination of examples 1-5, wherein, to determine whether to operate in the armed state, the arming module is configured to: determine a threshold arming delay based on a voltage at an external resistor and the current plateau voltage of the arming signal; and compare a current arming delay to the threshold arming delay, wherein the arming module is configured to determine to operate in the armed state in response to determining that the current arming delay exceeds the threshold arming delay and in response to determining that the current plateau voltage exceeds the threshold plateau voltage.

Example 7

The circuit of any combination of examples 1-6, wherein the arming module comprises: a low pass filter configured to filter the previous plateau voltage using a low-pass filter function to generate a filtered previous plateau voltage; a super rectifier circuit configured to sample the filtered previous plateau voltage to generate a sampled previous plateau voltage; a capacitor configured to store the sampled previous plateau voltage; a voltage divider configured to generate the voltage indicative of the threshold plateau voltage using the sampled previous plateau voltage stored at the capacitor; a delay module configured to output a set value when the current plateau voltage exceeds the voltage indicative of the threshold plateau voltage and when the current arming delay exceeds the threshold arming delay; and a flip-flop configured to store the set value from the delay module until a reset value is received, wherein the arming module determines that the current arming delay exceeds the threshold arming delay and that the current plateau voltage exceeds the threshold plateau voltage when the flip-flop is storing the set value.

Example 8

The circuit of any combination of examples 1-7, wherein the arming module further comprises: a first pulse generator configured to activate, during a start-up state, a first switching element that couples the capacitor to a regulated voltage such that the capacitor has a voltage corresponding to the regulated voltage during the start-up state; and a second pulse generator configured to activate, during the start-up state, a second switching element that couples the capacitor to a regulated current such that the capacitor is discharging during the start-up state.

Example 9

The circuit of any combination of examples 1-8, wherein the control module further comprises a continuous conduction mode module configured to: generate a voltage indicative of a threshold activation duration, the voltage indicative of the threshold activation duration being based on a previous activation duration of the synchronous rectifier; and deactivate the synchronous rectifier when a current activation duration of the synchronous rectifier exceeds the threshold activation duration.

Example 10

The circuit of any combination of examples 1-9, wherein the continuous conduction mode module comprises: a current source configured to output a regulated current; a ramp capacitor configured to receive the regulated current from the current source, wherein a voltage at the ramp capacitor indicates the previous activation duration; a timer capacitor; a first pulse generator configured to activate, based on the triggering signal, a first switching element that couples the ramp capacitor to the timer capacitor such that the timer capacitor has a voltage corresponding to a voltage at the ramp capacitor; a voltage divider configured to receive the voltage at the timer capacitor and to output the voltage indicative of the threshold activation duration; a second pulse generator configured to activate, based on the triggering signal, after the first pulse generating activates the first switching element, a second switching element that discharges the ramp capacitor, wherein a voltage at the ramp capacitor after discharging the ramp capacitor indicates the current activation duration; a comparator configured to output a value for deactivating the synchronous rectifier when the voltage at the ramp capacitor exceeds the voltage indicative of the threshold activation duration; and a third pulse generator configured to deactivate the synchronous rectifier in response to receiving the value for deactivating the synchronous rectifier from the comparator.

Example 11

A method for controlling synchronous rectification, the method comprising: providing a first current into parasitic capacitance at a drain pin when a drain of a synchronous rectifier draws current from the parasitic capacitance, wherein the drain pin is coupled to the drain of the synchronous rectifier via a resistor; generating a triggering signal using the first current; drawing a second current from the parasitic capacitance when the drain of the synchronous rectifier provides current into the parasitic capacitance; generating an arming signal using the second current; and activating the synchronous rectifier using the triggering signal and the arming signal.

Example 12

The method of example 11, wherein providing the first current comprises: generating a control signal based on a voltage reference and a voltage at the drain pin; and modifying, based on the control signal, a resistance of a channel that electrically connects an input voltage to a first side of a feedback resistor, wherein a second side of the feedback resistor is coupled to the drain pin, wherein the feedback resistor has a resistance value corresponding to the resistor, and wherein generating the triggering signal comprises generating the triggering signal at the first side of the feedback resistor; and wherein providing the second current comprises: generating the arming signal based on the voltage reference and the voltage at the drain pin; and modifying, based on the arming signal, a resistance of a channel that electrically connects the drain pin to a reference node.

Example 13

The method of any combination of examples 11-12, further comprising: determining, using the arming signal, whether to operate in an armed state when operating in a deactivated state, wherein the synchronous rectifier is deactivated during the deactivated state and wherein the synchronous rectifier is deactivated during the armed state; determining, using the triggering signal, whether to operate in an activated state when operating in the armed state, wherein the synchronous rectifier is activated during the activated state; and determining, using the triggering signal, whether to operate in the deactivated state when operating in the activated state.

Example 14

The method of any combination of examples 11-13, wherein determining whether to operate in the deactivated state comprises determining, using the triggering signal, whether a negative drain to source voltage at the synchronous rectifier corresponds to zero.

Example 15

The method of any combination of examples 11-14, wherein determining whether to operate in the armed state comprises: determining a threshold arming delay based on a voltage at an external resistor and the current plateau voltage of the arming signal; and comparing a current plateau voltage of the arming signal to the threshold plateau voltage.

Example 16

The method of any combination of examples 11-15, wherein determining whether to operate in the armed state comprises: generating a voltage indicative of a threshold arming delay, the voltage indicative of the threshold arming delay voltage being based on a voltage at an external resistor and the current plateau voltage of the arming signal; and comparing a current arming delay to the threshold arming delay, wherein the arming module is configured to determine to operate in the armed state in response to determining that the current arming delay exceeds the threshold arming delay and in response to determining that the current plateau voltage exceeds the threshold plateau voltage.

Example 17

The method of any combination of examples 11-16, wherein determining whether to operate in the armed state comprises: filtering the previous plateau voltage using a low-pass filter function; sampling the previous plateau voltage to generate a sampled previous plateau voltage; storing, at a capacitor, the sampled previous plateau voltage; generating, by a voltage divider, the voltage indicative of the threshold plateau voltage using the sampled previous plateau voltage stored at the capacitor; outputting a set value when the current plateau voltage exceeds the voltage indicative of the threshold plateau voltage and when the current arming delay exceeds the threshold arming delay; and storing the set value until a reset value is received.

Example 18

The method of any combination of examples 11-17, wherein determining whether to operate in the armed state comprises: activating, during a start-up state, a first switching element that couples the capacitor to a regulated voltage such that the capacitor has a voltage corresponding to the regulated voltage during the start-up state; and activating, during the start-up state, a second switching element that couples the capacitor to a regulated current such that the capacitor is discharging during the start-up state.

Example 19

The method of any combination of examples 11-18, further comprising: generating a voltage indicative of a threshold activation duration, the voltage indicative of the threshold activation duration being based on a previous activation duration of the synchronous rectifier; and deactivating the synchronous rectifier when a current activation duration of the synchronous rectifier exceeds the threshold activation duration.

Example 20

The method of any combination of examples 11-19, wherein generating the voltage indicative of the threshold activation duration comprises: outputting a regulated current to a ramp capacitor, wherein a voltage at the ramp capacitor indicates the previous activation duration; activating, based on the triggering signal, a first switching element that couples the ramp capacitor to a timer capacitor such that at a voltage at the timer capacitor corresponds to a voltage at the ramp capacitor; and generating, by a voltage divider, a voltage indicative of the threshold activation duration using the voltage at the timer capacitor; and wherein deactivating the synchronous rectifier comprises: activating, based on the triggering signal, after activating the first switching element, a second switching element that discharges the ramp capacitor; outputting, after activating the second switching element, the regulated current to the ramp capacitor, wherein the voltage at the ramp capacitor indicates the current activation duration after activating the second switching element; and deactivating the synchronous rectifier when the voltage at the ramp capacitor exceeds the voltage indicative of the threshold activation duration.

Example 21

A power converter device comprising: a synchronous rectifier comprising a drain; a resistor having a first side and a second side, the first side being coupled to the drain; a drain pin coupled to the second side of the resistor; a first current compensation module configured to: provide a first current into parasitic capacitance at the drain pin when the drain of the synchronous rectifier draws current from the parasitic capacitance; and generate a triggering signal using the first current; a second current compensation module configured to: draw a second current from the parasitic capacitance when the drain of the synchronous rectifier provides current into the parasitic capacitance; and generate an arming signal using the second current; and a control module configured to activate the synchronous rectifier using the triggering signal and the arming signal.

Example 22

The circuit of example 21, wherein the synchronous rectifier is arranged in a flyback converter.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

Various aspects have been described in this disclosure. These and other aspects are within the scope of the following claims.

The invention claimed is:

1. A circuit for controlling synchronous rectification, the circuit comprising:
   a first current compensation module configured to:
      provide a first current into parasitic capacitance at a drain pin when a drain of a synchronous rectifier draws current from the parasitic capacitance, wherein the drain pin is coupled to the drain of the synchronous rectifier via a resistor; and
      generate a triggering signal using the first current;
   a second current compensation module configured to:
      draw a second current from the parasitic capacitance when the drain of the synchronous rectifier provides current into the parasitic capacitance; and
      generate an arming signal using the second current; and
   a control module configured to activate the synchronous rectifier using the triggering signal and the arming signal.

2. The circuit of claim 1,
   wherein the first current compensation module comprises:
      a first wide bandwidth operational amplifier comprising a non-inverting input coupled to a voltage reference, an inverting input coupled to the drain pin, and an output; and
      a first switching element configured to modify, based on a control signal at the output of the first wide bandwidth operational amplifier, a resistance of a channel that electrically connects an input voltage to a first side of a feedback resistor, wherein a second side of the feedback resistor is coupled to the drain pin, wherein the feedback resistor has a resistance value corresponding to the resistor, and wherein the first switching element generates the triggering signal at the first side of the feedback resistor; and
   wherein the second current compensation module comprises:
      a second wide bandwidth operation amplifier comprising an inverting input coupled to the voltage reference, a non-inverting input coupled to the drain pin, and an output, wherein the second wide bandwidth operation amplifier generates the arming signal at the output of the second wide bandwidth operational amplifier; and
      a second switching element configured to modify, based on the arming signal, a resistance of a channel that electrically connects the drain pin to a reference node of the circuit.

3. The circuit of claim 1, wherein the control module comprises:
   an arming module configured to determine, using the arming signal, whether to operate in an armed state when operating in a deactivated state, wherein the control module is configured to deactivate the synchronous rectifier during the deactivated state and wherein the control module is configured to deactivate the synchronous rectifier during the armed state; and
   a trigging module configured to:
      determine, using the triggering signal, whether to operate in an activated state when operating in the armed state, wherein the control module is configured to activate the synchronous rectifier during the activated state; and
      determine, using the triggering signal, whether to operate in the deactivated state when operating in the activated state.

4. The circuit of claim 3, wherein, to determine whether to operate in the deactivated state, the triggering module is configured to determine, using the triggering signal, whether a negative drain to source voltage at the synchronous rectifier corresponds to zero.

5. The circuit of claim 3, wherein, to determine whether to operate in the armed state, the arming module is configured to:
   generate a voltage indicative of a threshold plateau voltage, the voltage indicative of the threshold plateau voltage being based on a previous plateau voltage of the arming signal; and
   compare a current plateau voltage of the arming signal to the threshold plateau voltage.

6. The circuit of claim 5, wherein, to determine whether to operate in the armed state, the arming module is configured to:
   determine a threshold arming delay based on a voltage at an external resistor and the current plateau voltage of the arming signal; and
   compare a current arming delay to the threshold arming delay, wherein the arming module is configured to determine to operate in the armed state in response to determining that the current arming delay exceeds the threshold arming delay and in response to determining that the current plateau voltage exceeds the threshold plateau voltage.

7. The circuit of claim 6, wherein the arming module comprises:
   a low pass filter configured to filter the previous plateau voltage using a low-pass filter function to generate a filtered previous plateau voltage;
   a super rectifier circuit configured to sample the filtered previous plateau voltage to generate a sampled previous plateau voltage;
   a capacitor configured to store the sampled previous plateau voltage;
   a voltage divider configured to generate the voltage indicative of the threshold plateau voltage using the sampled previous plateau voltage stored at the capacitor;

a delay module configured to output a set value when the current plateau voltage exceeds the voltage indicative of the threshold plateau voltage and when the current arming delay exceeds the threshold arming delay; and a flip-flop configured to store the set value from the delay module until a reset value is received, wherein the arming module determines that the current arming delay exceeds the threshold arming delay and that the current plateau voltage exceeds the threshold plateau voltage when the flip-flop is storing the set value.

8. The circuit of claim 1, wherein the control module further comprises a continuous conduction mode module configured to:

generate a voltage indicative of a threshold activation duration, the voltage indicative of the threshold activation duration being based on a previous activation duration of the synchronous rectifier; and deactivate the synchronous rectifier when a current activation duration of the synchronous rectifier exceeds the threshold activation duration.

9. The circuit of claim 8, wherein the continuous conduction mode module comprises:

a current source configured to output a regulated current;

a ramp capacitor configured to receive the regulated current from the current source, wherein a voltage at the ramp capacitor indicates the previous activation duration;

a timer capacitor;

a first pulse generator configured to activate, based on the triggering signal, a first switching element that couples the ramp capacitor to the timer capacitor such that the timer capacitor has a voltage corresponding to a voltage at the ramp capacitor;

a voltage divider configured to receive the voltage at the timer capacitor and to output the voltage indicative of the threshold activation duration;

a second pulse generator configured to activate, based on the triggering signal, after the first pulse generating activates the first switching element, a second switching element that discharges the ramp capacitor, wherein a voltage at the ramp capacitor after discharging the ramp capacitor indicates the current activation duration;

a comparator configured to output a value for deactivating the synchronous rectifier when the voltage at the ramp capacitor exceeds the voltage indicative of the threshold activation duration; and a third pulse generator configured to deactivate the synchronous rectifier in response to receiving the value for deactivating the synchronous rectifier from the comparator.

10. A method for controlling synchronous rectification, the method comprising:

providing a first current into parasitic capacitance at a drain pin when a drain of a synchronous rectifier draws current from the parasitic capacitance, wherein the drain pin is coupled to the drain of the synchronous rectifier via a resistor;

generating a triggering signal using the first current;

drawing a second current from the parasitic capacitance when the drain of the synchronous rectifier provides current into the parasitic capacitance;

generating an arming signal using the second current; and activating the synchronous rectifier using the triggering signal and the arming signal.

11. The method of claim 10, wherein providing the first current comprises:

generating a control signal based on a voltage reference and a voltage at the drain pin; and modifying, based on the control signal, a resistance of a channel that electrically connects an input voltage to a first side of a feedback resistor, wherein a second side of the feedback resistor is coupled to the drain pin, wherein the feedback resistor has a resistance value corresponding to the resistor, and wherein generating the triggering signal comprises generating the triggering signal at the first side of the feedback resistor; and wherein providing the second current comprises:

generating the arming signal based on the voltage reference and the voltage at the drain pin; and modifying, based on the arming signal, a resistance of a channel that electrically connects the drain pin to a reference node.

12. The method of claim 10, further comprising:

determining, using the arming signal, whether to operate in an armed state when operating in a deactivated state, wherein the synchronous rectifier is deactivated during the deactivated state and wherein the synchronous rectifier is deactivated during the armed state;

determining, using the triggering signal, whether to operate in an activated state when operating in the armed state, wherein the synchronous rectifier is activated during the activated state; and determining, using the triggering signal, whether to operate in the deactivated state when operating in the activated state.

13. The method of claim 12, wherein determining whether to operate in the deactivated state comprises determining, using the triggering signal, whether a negative drain to source voltage at the synchronous rectifier corresponds to zero.

14. The method of claim 12, wherein determining whether to operate in the armed state comprises:

determining a threshold arming delay based on a voltage at an external resistor and the current plateau voltage of the arming signal; and comparing a current plateau voltage of the arming signal to the threshold plateau voltage.

15. The method of claim 14, wherein determining whether to operate in the armed state comprises:

generating a voltage indicative of a threshold arming delay, the voltage indicative of the threshold arming delay voltage being based on a voltage at an external resistor and the current plateau voltage of the arming signal; and comparing a current arming delay to the threshold arming delay, wherein the arming module is configured to determine to operate in the armed state in response to determining that the current arming delay exceeds the threshold arming delay and in response to determining that the current plateau voltage exceeds the threshold plateau voltage.

16. The method of claim 15, wherein determining whether to operate in the armed state comprises:

filtering the previous plateau voltage using a low-pass filter function;

sampling the previous plateau voltage to generate a sampled previous plateau voltage;

storing, at a capacitor, the sampled previous plateau voltage;

generating, by a voltage divider, the voltage indicative of the threshold plateau voltage using the sampled previous plateau voltage stored at the capacitor;

outputting a set value when the current plateau voltage exceeds the voltage indicative of the threshold plateau voltage and when the current arming delay exceeds the threshold arming delay; and storing the set value until a reset value is received.

17. The method of claim 10, further comprising:

generating a voltage indicative of a threshold activation duration, the voltage indicative of the threshold activation duration being based on a previous activation duration of the synchronous rectifier; and deactivating the synchronous rectifier when a current activation duration of the synchronous rectifier exceeds the threshold activation duration.

18. The method of claim 17, wherein generating the voltage indicative of the threshold activation duration comprises:

outputting a regulated current to a ramp capacitor, wherein a voltage at the ramp capacitor indicates the previous activation duration;

activating, based on the triggering signal, a first switching element that couples the ramp capacitor to a timer capacitor such that at a voltage at the timer capacitor corresponds to a voltage at the ramp capacitor; and generating, by a voltage divider, a voltage indicative of the threshold activation duration using the voltage at the timer capacitor; and wherein deactivating the synchronous rectifier comprises:

activating, based on the triggering signal, after activating the first switching element, a second switching element that discharges the ramp capacitor;

outputting, after activating the second switching element, the regulated current to the ramp capacitor, wherein the voltage at the ramp capacitor indicates the current activation duration after activating the second switching element; and deactivating the synchronous rectifier when the voltage at the ramp capacitor exceeds the voltage indicative of the threshold activation duration.

19. A power converter device comprising:

a synchronous rectifier comprising a drain;

a resistor having a first side and a second side, the first side of the resistor being coupled to the drain;

a drain pin coupled to the second side of the resistor;

a first current compensation module configured to:
provide a first current into parasitic capacitance at the drain pin when the drain of the synchronous rectifier draws current from the parasitic capacitance; and
generate a triggering signal using the first current;

a second current compensation module configured to:
draw a second current from the parasitic capacitance when the drain of the synchronous rectifier provides current into the parasitic capacitance; and
generate an arming signal using the second current; and a control module configured to activate the synchronous rectifier using the triggering signal and the arming signal.

20. The device of claim 19, wherein the synchronous rectifier is arranged in a flyback converter.

* * * * *